E. E. A. WILD.
TIRE GUARD.
APPLICATION FILED JULY 20, 1916.
1,230,255.
Patented June 19, 1917.
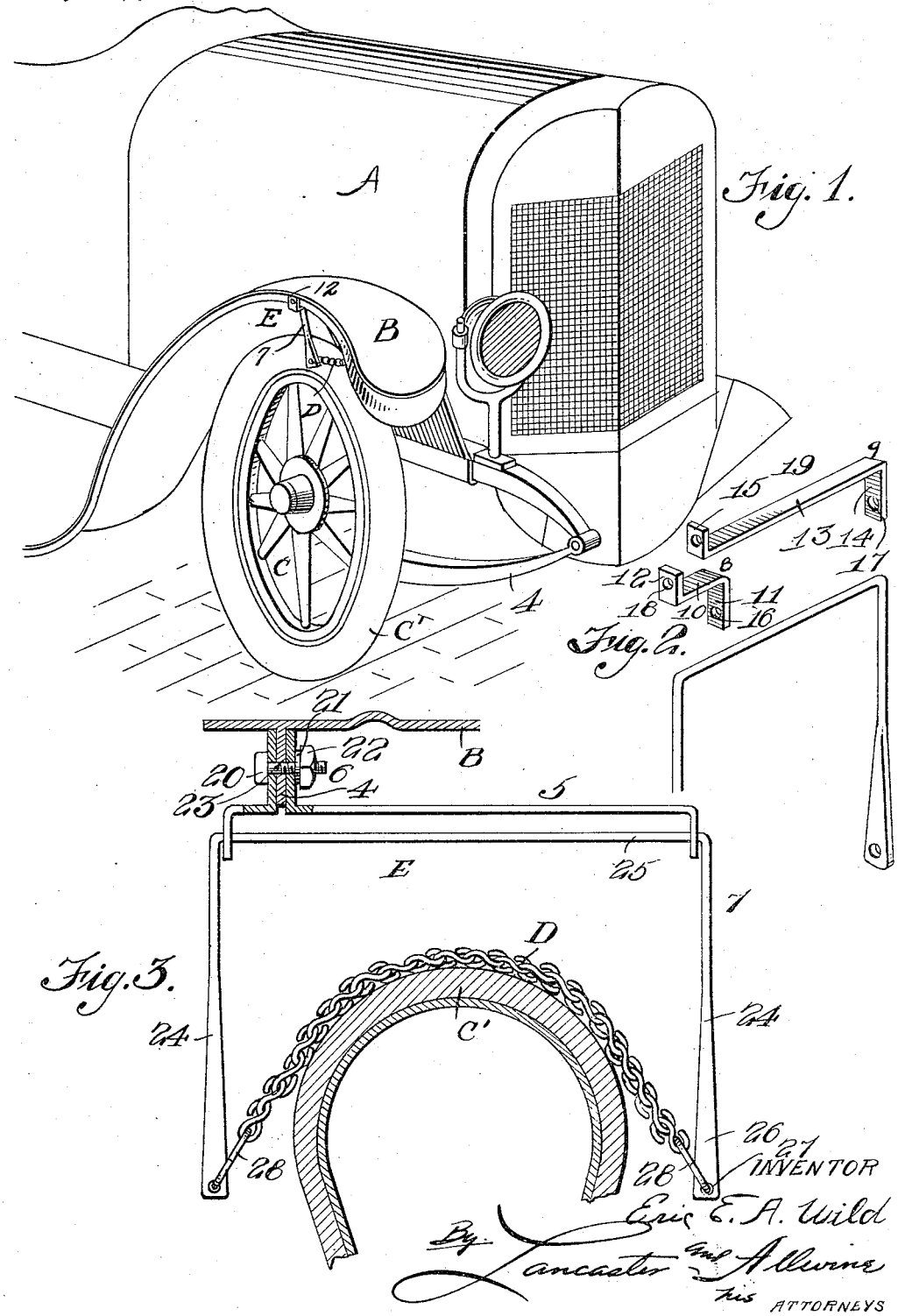

UNITED STATES PATENT OFFICE.

ERIC EDWIN ARTHUR WILD, OF MINNEAPOLIS, MINNESOTA.

TIRE-GUARD.

1,230,255.   Specification of Letters Patent.   Patented June 19, 1917.

Application filed July 20, 1916.   Serial No. 110,328.

*To all whom it may concern:*

Be it known that I, ERIC E. A. WILD, a subject of the King of Great Britain, and a resident of Minneapolis, in the county of Hennepin and State of Minnesota, have invented a certain new and useful Improvement in Tire-Guards, of which the following is a specification.

My present invention relates to a guard for resilient tires of that nature to be placed into operative relation thereto, but not carried by the tire, for the purpose of effectively removing tacks, nails, stones and other foreign matter which may become embedded in or adhere to the tread portion of the tire, thereby preventing punctures and blowouts, and adding longevity to the tire.

The principal objects of my invention are to provide a guard of the character described which may be quickly attached to or detached from a vehicle embodying the resilient tire; to provide a guard embodying parts so disposed that it will be, at all times, in operative relation to the tire even though placed to act upon a tire forming a part of a wheel used in steering, where the plane of the wheel is moved with respect to the axis of the vehicle, or where the body moves to and from the running gear; and, to provide a guard which will operate successfully even though the vehicle be backed for a considerable distance.

Other objects of my invention are to provide a guard of the character described which is simple in construction, inexpensive to manufacture, and neat in appearance.

Other objects of my invention will appear in the following detailed description, taken in connection with the accompanying drawing, forming a part of this specification, and in which drawing:

Figure 1 is a perspective view of the front portion of a motor vehicle showing a tire guard constructed according to my invention, applied thereto.

Fig. 2 is a perspective view of portions of a guard constructed according to my invention, the parts being shown separated one from another to disclose details.

Fig. 3 is a view partly in elevation and partly in section showing a modified form of tire guard, the tire being shown in operative relation thereto, as well as a portion of the vehicle body.

In the drawing, where similar characters refer to similar parts throughout the views, A designates a vehicle body including a mud guard B; C a wheel of said vehicle including a tire C'; D a chain or other flexible obstacle; and, E means for supporting said chain from said mud guard to engage said tire above its axis of rotation.

In the application of an invention of this character to all types of vehicles using resilient tires, consideration must be given to the fact that one or more wheels are used for steering purposes and are carried by the vehicle so that a wheel for this purpose may be moved with its plane either parallel to or out of parallel relation with the longitudinal axis of the vehicle.

While I have hereinafter described the invention as applied to a mud guard of a vehicle body, it is to be understood that this is merely by way of example since the invention is applicable to vehicles of many types and may be applied to the bodies thereof in any suitable manner, without departing from the spirit or scope of my invention except in so far as the terms of the claims import.

In the example shown, the tire guard is applied to a vehicle wherein the body A is resiliently mounted upon the wheel C as by springs 4, so that there is relative movement between the body and wheels. The mud guard B is provided with the usual downwardly extending longitudinal flange 4.

As to the chain D, it may be of any suitable type and serves as an obstacle, disposed in the path of foreign matters which may become embedded in or adhere to the tire. In practice, when the wheel is revolving rapidly, the chain is a fraction of an inch off the surface of the tire and hence does not wear the tread portion thereof. It is a well known fact that a puncture seldom, if ever occurs during the first revolution of the wheel, after the object engages the tire, and as a matter of fact, it takes a number of revolutions of the wheel to force obstacles through the casing to the inner tube. By use of an obstacle which is flexible throughout its length and so disposed as to engage or lie in close proximity to the tread of the tire, such foreign matter is removed or dislodged during the first revolution.

Referring now to the means E for supporting the chain, it comprises a support designated generally by 5, a device 6 for securing said support to the vehicle body A; and, a hanger 7 pivotally carried by support 5 and to which the chain D is secured. It is to be preferred to make the support 5 of two parts 8 and 9, the former being relatively smaller than the latter, the part 8 including a horizontal portion 10, a downwardly extending arm 11 and an upwardly extending arm 12, while the part 9 consists of a horizontal portion 13, a downwardly extending arm 14, and an upwardly extending arm 15. Arms 11 and 14 are provided with perforations 16 and 17, respectively, which, when the parts of the supports are in operative relation one to another, aline, and the arms 12 and 15 are arranged so as to confront one another, and are provided with perforations 18 and 19 respectively, which also aline when the two parts of the support are in operative relation. As to the device E, it may comprise a bolt 20, the stem of which extends through perforations 18 and 19; a lock washer 21; and, a nut 22 adapted to be turned tight against said lock washer. When assembling the support 5 in operative relation to the vehicle body and in the example shown, connecting it with the flange 4 of mud guard B, the flange is perforated as at 23 to receive the shank of bolt 20. If the plane of the wheel C is substantially centered with respect to the mud guard B, the support 5 is assembled as shown in Fig. 3 of the drawing, so that the horizontal portion 13 of part 9 rests upon the horizontal portion 10 of part 8, the upper margins of the arms 12 and 15 engaging the under side of the mud guard. If the tire guard is to be applied to a motor vehicle in which the plane of the wheel is nearer the outer lateral margin of the mud guard, as in some makes of motor vehicles, the supports 5 are constructed so that the horizontal portions 10 and 13 of the parts 8 and 9 are in substantially the same plane, the arm 11 being offset outwardly from the flange 4 of the mud guard.

As to the hanger 7, it is preferably formed of a single piece of metal or wire into U-shape, providing downwardly extending arms 24, and a connection 25 therebetween the ends of the hanger being flattened as at 26, and may be perforated as at 27 to receive links 28 of chain D, the connection 25 extending through the alined perforations 16 and 17 of the parts 8 and 9, respectively, of support 5 so that the hanger 7 may swing freely about a horizontal axis.

Inasmuch as the chain D is pendantly supported, from a hanger, which hanger is bodily oscillatable about a horizontal axis, the said chain may engage the tire not only at its crown, but also laterally thereof and remove any matter which may become embedded in or adhere to the tire. By disposing the guard directly above the axis of rotation of the tire, the guard will operate effectively even though the vehicle be backed and, while there is little danger of matter becoming embedded in the tire sufficiently to puncture the inner tube as the car is being backed, it is to be noted that in addition to protecting the tire during the backing-up, the guard will in no way bind or become mutilated inasmuch as the chain adheres slightly to the tread surface, and swings the hanger 7 so that its arms 24 project rearwardly and downwardly with respect to the vehicle.

Changes in details may be made without departing from the spirit or scope of my invention; but,

I claim:—

1. A tire guard comprising in combination, a support including downwardly extending arms disposed in spaced relation and provided with alined perforations, a hanger carried by said support including two downwardly extending arms and a connection therebetween, said connection extending through the said perforations of said arms of said support to be pivotally carried thereby, and a chain with end portions pivotally connected with the lower portions of the said arms of said hanger.

2. A tire guard comprising in combination, a support, a hanger pivotally carried by said support, said hanger formed of a single piece of metal shaped to provide downwardly extending arms and a connection therebetween engaging said support, and a chain with end portions pivotally connected with the said arms of said hanger at the lower portions thereof.

3. A tire guard comprising in combination, a support, a hanger pivotally carried by said support, said hanger formed of a single piece of wire flattened at ends and shaped to provide downwardly extending arms and a connection therebetween engaging said support, and a chain with end portions pivotally connected with the said arms of said hanger at the lower portions thereof.

4. In combination with a vehicle body and wheel including a tire, of a support carried by said body, an inverted U-shaped hanger pivotally carried by said support and disposed above the axis of rotation of said wheel, and a chain carried by said arms of said hanger and engaging the tire of said wheel, said hanger permitting said chain to engage said tire during relative movement of said body with respect to said wheel, and to engage said tire with the arms of said hanger tangent to said tire regardless of the direction of rotation of said wheel.

5. A tire guard comprising in combination, a support including downwardly extending arms disposed in spaced relation, two arms pendantly carried by the said arms of said support, and a chain with end portions pivotally connected with the lower portions of said second mentioned arms.

ERIC EDWIN ARTHUR WILD.

Copies of this patent may be obtained for five cents each, by addressing the "Commissioner of Patents, Washington, D. C."